Jan. 19, 1960

R. L. FRANK 2,922,159

COURSE PLOTTER

Filed Nov. 28, 1956

INVENTOR
ROBERT L. FRANK
BY
ATTORNEY

United States Patent Office 2,922,159
Patented Jan. 19, 1960

2,922,159
COURSE PLOTTER

Robert L. Frank, Great Neck, N.Y., assignor to Sperry Rand Corporation, a corporation of Delaware Application November 28, 1956, Serial No. 624,949

21 Claims. (Cl. 343—112)

This invention relates to automatic plotting systems, and more particularly to a system for continuously indicating the position of a moving vehicle on a chart representing an area by comparing signals derived from photoelectrically scanning the chart with signals corresponding to the position of the vehicle with respect to the area.

Maps and charts of geographical areas are employed for use in navigating vehicles such as boats and aircraft. Such charts usually have a reference grid superposed on the geographical pattern. This grid may correspond to latitude and longitude coordinates, or to some other navigational coordinate system, such as the intersecting sets of hyperbolic lines of position used in loran or the intersecting sets of circular lines of position used in shoran. In plotting the position of a moving vehicle on such a chart, it is necessary to obtain continuous information of the position of the vehicle relative to the coordinate system employed, and using this information to interpolate between the lines of each set comprising the grid in order to depict the position of the vehicle on the chart.

Thus, in loran, the lines of position are hyperbolas and correspond to measured time differences between the arrival of pulses from radio transmitting stations. The intersection of a pair of lines of position corresponding to two measured time differences determines the position of the vehicle. For example, three adjacent grid lines of one set may represent time differences of 1400, 1600, and 1800 microseconds respectively. When the position of the vehicle does not correspond to a grid line, it is necessary for the plotting system to interpolate between the nearest grid lines. Thus, if one value of time difference at the location of the vehicle were 1450 microseconds, the position of the vehicle on the chart would have to be represented at one-quarter of the distance between the grid lines corresponding to 1400 and 1600 microseconds.

In a patent application Serial No. 577,401 filed April 10, 1956 in the name of Wilbert P. Frantz, and assigned to the same assignee as the instant invention, there is disclosed a system for automatically interpolating between two grid lines in order to represent the position of a vehicle between two discrete coordinate lines corresponding to said two grid lines. (For purposes of this description a discrete coordinate line is defined as a navigational coordinate line corresponding to a grid line.) This is accomplished by comparing photoscanner output signals, derived from photoelectrically scanning the chart, with an input signal corresponding to the instantaneous position of the vehicle with respect to the two discrete coordinate lines. A path transverse to the grid lines is scanned and a first voltage produced representing the chart distance between the two grid lines. This first voltage is supplied to a voltage divider which delivers a proportionate second voltage determined by the input signal. A third voltage is produced representing the distance between one of said two grid lines and a reference point fixed with respect to the photoscanner. A voltage comparator responsive to the difference between the second and third voltages energizes a servomotor to vary the position of the photoscanner until the reference point represents the position of the vehicle on the chart.

The vehicle may travel sufficiently far, however, that the locus of its course on the chart crosses a grid line. In such instance the interpolation circuit will not function to drive the reference point across the grid line. Accordingly, means must be added to the previously described system to enable the automatic plotting of the course of a vehicle when the locus of said course crosses a grid line. Such a system is described in a patent application Serial No. 594,264, filed June 27, 1956 in the names of Donald E. Jackson and Roger B. Williams, Jr., assigned to the same assignee as the instant invention.

The instant invention is concerned with a system for continuously indicating the position of a moving vehicle, wherein the photoscanner scans a chart having two intersecting sets of grid lines superposed thereon to correspond with discrete lines of the two intersecting sets of lines of position necessary for navigation over or above the earth's surface. The photoscanner, while scanning the chart, must be able to distinguish between the two sets of grid lines in order to derive separate output signals from each set. Each of these output signals must be compared respectively with the proper one of two input signals, each input signal representing the position of the vehicle with respect to the discrete lines of one set of lines of position.

It is therefore the principal object of this invention to provide improved apparatus for automatically plotting the locus of the course of a vehicle on a chart representing the area in which the vehicle is operating, said chart having at least two intersecting sets of grid lines corresponding to the navigational coordinate system in said area.

It is a further object of this invention to automatically and continuously plot the position of a vehicle on a chart having superposed thereon a pair of intersecting reference grids.

It is a further object of this invention to automatically move an object with respect to a grid on a chart representing an area in accordance with input navigational signals representing the position of a vehicle with respect to said area.

It is a further object of this invention to transform a plurality of first type coordinates descriptive of the position of a point with respect to a region into a plurality of second type coordinates.

In accordance with the present invention a pair of color filters are alternately interposed between the photoscanner and the chart being scanned. Each of the two sets of grid lines on the chart is of a different color. When one of the filters is interposed between the photoscanner and the chart, output signals representing but one set of grid lines are delivered by the photoscanner. When the other filter is interposed, the photoscanner output signals represent the other set of grid lines. Means are provided to orient the photoscanner with respect to the chart so that the direction of scan is parallel to a diagonal of the parallelogram-like area formed by the grid lines in the vicinity of the reference point. Two voltage comparators compare signals representing the position of the reference point with respect to each set of grid lines to respective input signals representing the position of the vehicle with respect to each set of corresponding coordinate lines. The pair of error signals thus generated by the voltage comparators are coupled to a resolver connected to the axis of the photoscanner. The output of the resolver is employed to drive a pair of orthogonally oriented servomotors, each respectively moving the reference point to represent the position of the vehicle on the chart.

The present invention will now be described with reference to the following drawings wherein.

*Scanning and positioning apparatus*

Figures 1A, 2, 3:
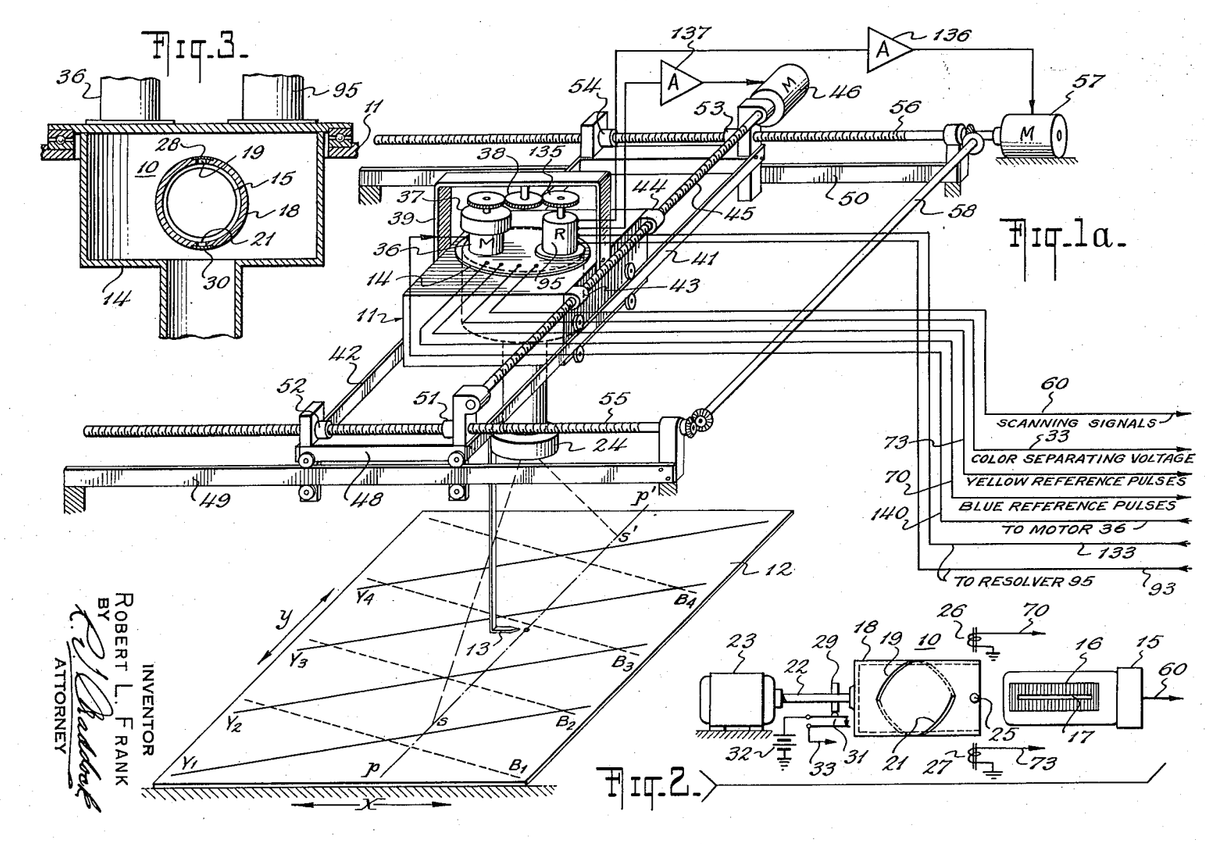
Figs. 1a, 1b constitute schematic diagrams of the scanning and positional control system of the present invention.
Fig. 2 is an exploded view of the photoscanner employed in the system of Fig. 1.
Fig. 3 is a section through the housing of Fig. 1 including the photoscanner.

Referring to Fig. 1a, a housing 14 is supported by a carriage 11. The housing 14 contains a photoelectric scanning device, hereinafter termed a photoscanner, and shown in Figs. 2 and 3, where it is generally designated by the reference character 10. Housing 14 is arranged for rotation about a vertical axis extending through the center of the photoscanner. The photoscanner is disposed above the chart 12 on which is superposed a grid system corresponding to the navigational coordinate system employed in the area in which the vehicle is to navigate. The grid system comprises two sets of grid lines, one set including the yellow lines $Y_1$–$Y_4$, and the other set including the blue lines $B_1$–$B_4$. Although generally the grid lines will be curved, in any small region they can be considered approximately straight, as shown in the figure. The photoscanner scans the chart along a locus $p$—$p'$ transversely to the grid lines. An indicator 13, or other reference point fixed with respect to photoscanner 10 is representative of the photoscanner's position with respect to the chart. When the apparatus is in operation the position of the indicator with respect to the chart will correspond to the position of the vehicle with respect to the area represented by the chart. Although indicator 13 is shown affixed to housing 14 it may be oriented for recording on a second adjacent chart, which represents the same area as chart 12, thereby avoiding possible interference with the photoelectric scanning operation.

Photoscanner 10 includes a phototube 15 whose photocathode is covered with a mask 16 having a long narrow aperture 17 extending parallel to the longitudinal axis of the phototube, as illustrated in Fig. 2. The phototube with mask is inserted within a hollow cylindrical drum 18, which has a first one-half turn helical slit 19 and a second one-half turn helical slit 21 through the wall thereof. Light to be admitted to the photo-cathode of phototube 15 passes through the opening defined by the intersection of one of the narrow helical slits 19 or 21 and the elongated aperture 17. Cylindrical drum 18 is rotated at constant angular velocity by a shaft 22 in turn driven by a motor 23, to provide scanning along a straight line extending parallel to the longitudinal axis of the cylindrical drum. Two complete scanning cycles are produced for each revolution of the drum. The image of the chart along the line segment $s$—$s'$ is focused at the plane of aperture 17 by a lens 24. As the point of intersection of one of slits 19 or 21 and aperture 17 moves due to rotation of drum 18 different elements of the scanned line segment are exposed to the phototube. The photoscanner is similar to that shown in application Serial No. 473,249 filed December 6, 1954 in the name of Roger B. Williams, Jr. and assigned to the same assignee as the present invention.

Drum 18 is provided with a magnetic tab 25 attached to its outside wall. Magnetic tab 25 revolves past first and second pickup coils 26 and 27. Each time tab 25 moves past pickup coils 26 and 27 a reference pulse voltage is induced across the terminals thereof at the instant the photoscanner is scanning the center point of the segment $s$—$s'$.

Each of the helical slits 19 and 21 is covered with a filter for separating the response of phototube 15 to the yellow lines and the blue lines on chart 12. A color filter 28 for helical slit 19 is shown in Fig. 3. Color filter 28 is selected to allow the photoscanner to respond to the blue lines without responding to the yellow lines. Similarly another color filter 30 covering helical slit 21 is selected to allow the photoscanner to respond to the yellow lines without responding to the blue lines.

Photoscanner 10 is provided with a cam 29 attached to shaft 22 for closing a single-pole single-throw switch 31 throughout each alternate half revolution of shaft 22 to produce a color separating square wave voltage. Switch 31 is closed during the half revolution of the photoscanner that the yellow lines are being scanned through helical slit 21. Switch 31 completes a circuit through a battery 32 to produce the color separating voltage on a lead 33.

The direction of scan of photoscanner 10 is controlled by orienting its angular position about its vertical axis by means of a servomotor 36. The frame or shell of servomotor 36 is mounted directly on housing 14 at a position displaced from the vertical axis passing through the center of the photoscanner. The shaft of servomotor 36 extends parallel to the vertical axis and is coupled through a gear reduction unit 37 to a stationary spur gear 38. The vertical axis of the photoscanner passes through the center of spur gear 38. Spur gear 38 is rigidly supported from a U-shaped bracket 39, attached to carriage 11. When servomotor 36 is energized it drives itself through gear reduction unit 37 around the periphery of spur gear 38 thereby orienting photoscanner 10 about its vertical axis. The photoscanner is oriented to scan along the straight lie segment $s$—$s'$, which is substantially parallel to the short diagonals of the parallelograms formed by the intersecting lines $Y_1$–$Y_4$ and $B_1$–$B_4$ on chart 12, as described and claimed in U.S. patent application Serial No. 537,629, filed September 30, 1955 in the name of Robert L. Frank and assigned to the same assignee as the present invention.

The position of photoscanner 10 and carriage 11 is movable in rectangular coordinates over any portion of chart 12. Carriage 11 is suspended between two rails 41 and 42, which form a track for guiding carriage 11 along a direction which will be referred to as the $y$ axis. Four wheels or rollers are mounted on each side of carriage 11 for supporting the carriage from the rails 41 and 42. Two threaded portions 43 and 44 attached to one side of carriage 11 receive a threaded shaft or lead screw 45, which is coupled to $y$-axis servomotor 46. Servomotor 46 is rigidly mounted with respect to the rails 41 and 42. Rotation of the lead screw 45 by servomotor 36 positions photoscanner 10 and carriage 11 along the $y$ axis.

Rails 41 and 42 extend between and form part of a platform 48, which supports photoscanner 10 and carriage 11. Platform 48 is supported between two rails 49 and 50 by rollers or wheels as shown. Rails 49 and 50 form a track for guiding platform 48 along a direction which will be referred to as the $x$-axis. Four threaded portions 51, 52, 53, 54 attached to platform 48 receive threaded shafts or lead screws 55 and 56. An $x$-axis servomotor 57 is mechanically coupled through gears to drive a shaft 58, which in turn drives the lead screws 55 and 56 to position platform 48.

*Interpolation between grid lines*

Photoscanner 10 in scanning the yellow lines and the blue lines each revolution of drum 18 delivers alternate recurrent groups of pulses on a lead 60. As line segment $s$—$s'$ is scanned, in the example in Fig. 1 grid lines $B_2$, $B_3$, $B_4$ and $Y_2$, $Y_3$, $Y_4$ will be scanned and each alternate group of recurrent pulses from lead 60 will contain three pulses. These pulses are amplified and shaped in a pulse amplifier 61 to produce pulses of waveform A, illustrated in Fig. 4. The time between pulses of each group of waveform A varies according to the distance between the respective group lines $B_2$, $B_3$, $B_4$ and $Y_4$, $Y_3$, $Y_4$, as measured along the locus $p$—$p'$. In waveform A the recurrent pulses are identified by the lines to which they correspond. Photoscanner 10 is arranged to scan at least a total distance equal to two and one-half times the length of the greatest short diagonal of the grid parallelograms.

Figure 4:
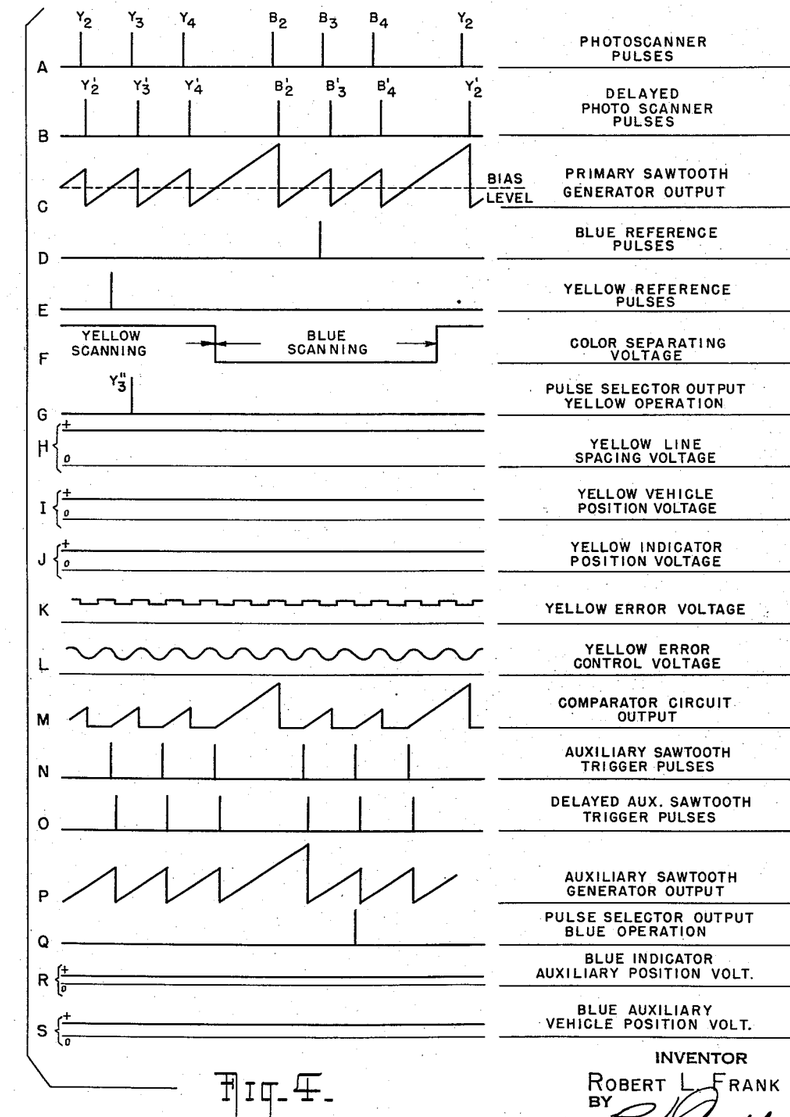
Fig. 4 illustrates waveforms of voltages associated with the diagram of Fig. 1.

The recurrent pulses of waveform A are coupled to the respective lower fixed contacts of relay sections 62 and 63 of respective relays 34 and 35 and to a delay pulse generator 64, the latter producing the slightly delayed output pulses of waveform B. A primary sawtooth generator 65 is coupled to delay pulse generator 64 and is responsive to the pulses of waveform B, producing a primary linear sawtooth voltage wave of waveform C. The peak values of this primary sawtooth wave vary according to the respective time intervals between successive input pulses to generator 65, thereby representing the distances between adjacent grid lines. Thus, the peak value of the primary sawtooth cycle generated between the pulses designated as $Y_2'$ and $Y_3'$ is proportional to the distance between the grid lines $Y_2$ and $Y_3$, as measured along locus $p$—$p'$. The primary sawtooth wave of waveform C is coupled to the respective lower fixed contacts of relay sections 67 and 68 of respective relays 34 and 35 and to a comparator circuit 69.

The blue reference pulses (waveform D) induced in pick-up coil 26, and produced when the blue lines are being scanned are coupled through a lead 70 to a position sampling gate 71, where they act as gating pulses, and to a pulse selector 72. The yellow reference pulses (waveform E) induced in pick-up coil 27 and produced when the yellow lines are being scanned are coupled through a lead 73 to a position sampling gate 74, where they act as gating pulses, and to the pulse selector 72.

The color separating voltage (waveform F) delivered at lead 33 is applied to winding 76 of color separating relay 75, which serves to actuate the corresponding movable contacts of relay sections 77, 78 and 79. The movable contact of relay section 62 is connected to the lower fixed contact of relay section 77. The movable contact of relay section 63 is connected to the upper fixed contact of relay section 77. The movable contact of relay section 77 is connected to an input terminal of pulse selector 72.

*Yellow channel operation*

Figure 1B:
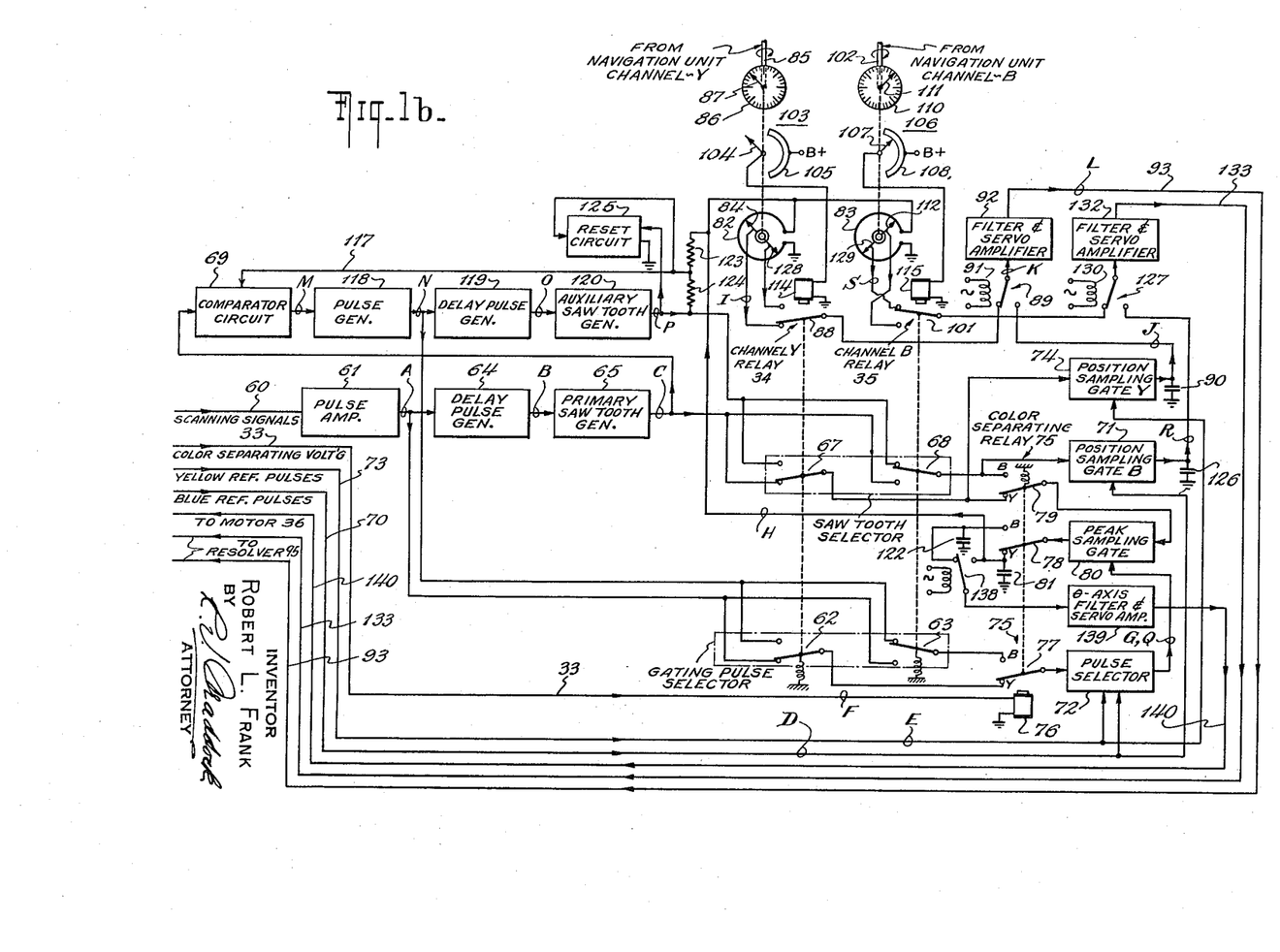

To insure a clear understanding of this invention it will be first described by considering its operation only during the intervals when the photoscanner is responsive to the yellow grid lines. During this interval photoscanner 10 is scanning the chart through slit 21 and the first three pulses of waveform A recur. Switch 31 is actuated and voltage is applied to relay coil 76. The movable contacts of relay sections 77, 78, 79 register with their respective lower fixed contacts, as shown in Fig. 1.

With the movable contact of relay section 62 in its lower position, pulse selector 72 delivers an output pulse coincident with only the first pulses of waveform A following the yellow reference pulses of waveform E. With the photoscanner positioned as shown in Fig. 1, the pulse corresponding to grid line $Y_3$ is the first pulse of waveform A to follow the yellow reference pulse, which corresponds to the position of indicator 13. The output signal of pulse selector 72 is shown in waveform G. The recurrent pulses of waveform G are applied as gating pulses to actuate a peak sampling gate 80.

With the movable contact of relay section 67 in its lower position, peak sampling gate 80 is recurrently actuated by the gating pulses of waveform G to periodically sample the magnitude of the primary sawtooth wave (waveform C) of sawtooth generator 65. Peak sampling gate 80 charges a capacitor 81 to the instantaneous voltage of the primary sawtooth wave at the instant of occurrence of the gating pulses of waveform G. Because waveform C lags slightly the pulses of waveform A, capacitor 81 is charged to a voltage equal to the peak voltage of the primary sawtooth cycle generated during the interval between the pulses $Y_2'$ and $Y_3'$ of waveform B. In other words, capacitor 81 produces a first direct voltage of waveform H whose magnitude is proportional to the distance between the grid lines $Y_2$ and $Y_3$.

This first direct voltage of waveform H is coupled to linear potentiometer voltage dividers 82 and 83, which may be of a continuously rotatable type. A second direct voltage of waveform I is produced at an arm 84 of voltage divider 82. The magnitude of the second direct voltage of waveform I bears a ratio to the magnitude of the first direct voltage of waveform H determined by the setting of a shaft 85. A dial 86 and a pointer 87 coupled to shaft 85 may be calibrated in terms of percent of angular rotation of shaft 85, such that when voltage divider 82 produces a second direct voltage at arm 84 whose magnitude is equal to the magnitude of the first direct voltage, the pointer 87 indicates 100%. When voltage divider 82 produces zero output voltage at arm 84, pointer 87 indicates 0%. Thus, where the linear potentiometer 82 is of the continuously rotatable type, one turn of shaft 85 represents 100% of the magnitude of the first direct voltage of waveform I. Accordingly, one turn of shaft 85 may be considered as representing the distance between the two yellow grid lines adjacent the indicator as measured along locus $p$—$p'$, and this relation is maintained regardless of the spacing between these lines. In the example shown one turn of shaft 85 corresponds to the distance between grid lines $Y_2$ and $Y_3$.

A yellow channel input positional signal representing the ratio of the distance of the vehicle from an adjacent coordinate line corresponding to grid line $Y_2$, to the distance between the discrete coordinate lines adjacent the vehicle corresponding respectively to grid lines $Y_2$ and $Y_3$, serves to position shaft 85. The percent rotation of shaft 85 corresponds directly to this ratio. Thus, the ratio of the second direct voltage to the first direct voltage is equal to this ratio. Consequently, voltage divider 82 acts as a proportioning means, delivering at arm 84 a voltage representing the position of the vehicle between grid lines $Y_2$ and $Y_3$. This second direct voltage produced at arm 84 is coupled to the lower fixed contact of a relay section 88 of relay 34. With the movable contact of relay section 88 in its lower position, the second direct voltage is coupled to the left fixed contact of a relay 89.

With the movable contact of relay section 67 in its lower position the primary sawtooth wave of primary sawtooth generator 65 is also coupled to the position sampling gate 74. Position sampling gate 74 is recurrently actuated by the yellow reference pulses of waveform E to periodically sample the magnitude of the sawtooth wave applied. Position sampling gate 74 charges a capacitor 90 to the instantaneous voltage of the input sawtooth wave at the instant of occurrence of the yellow reference pulses. Thus, in this illustration, capacitor 90 produces a direct voltage of waveform J whose magnitude is proportional to the distance between grid line $Y_2$ and the indicator. The direct voltage produced by capacitor 90 is coupled to the right fixed contact of relay 89.

An error control voltage whose magnitude varies according to the difference between the second direct voltage of waveform I and the direct voltage of waveform J is produced for controlling the position of photoscanner 10 along locus $p$—$p'$. An error voltage is obtained from the movable contact of relay 89. This movable contact alternates between the relay fixed contacts at the frequency of an alternating switching voltage supplied to relay winding 91 and serves to compare the magnitudes of the two direct voltages applied to the fixed contacts. For the condition when the magnitude of the second direct voltage of waveform I exceeds the magnitude of the direct voltage of waveform J, the voltage at the movable contact of relay 89 appears as waveform K of Fig.

4. This error voltage is coupled to a filter and servo amplifier 92 to produce the sinusoidal error control voltage of waveform L. The phase of this error control voltage is determined by the larger of the two direct voltages which were compared, and its amplitude is determined by the difference between the two voltages. The yellow error control voltage is coupled through a lead 93 to a first stator winding of a resolver 95. In a manner to be described later, resolver 95 provides an output signal which functions to operate servomotors 46 and 57 to drive the photoscanner until the yellow error control voltage is reduced substantially to zero, whereupon the position of the indicator with respect to the yellow grid lines corresponds to the position of the vehicle with respect to the corresponding navigational coordinate lines.

Thus, the system may be arranged to interpolate between two discrete loran lines of position, wherein grid lines $Y_2$, $Y_3$ on chart 12 represent two loran lines of one loran line set between which the vehicle is located. If the discrete loran lines corresponding to the grid lines are spaced apart by a constant fixed time difference interval, for example 100 microseconds, the shaft 85 must be properly geared and indexed to the input positional signal representing the measured loran number or time difference so that one revolution of shaft 85 corresponds to a change in time difference of 100 microseconds. A direct reading loran receiver such as the Mark II Loran manufactured by the Sperry Gyroscope Company, Division of Sperry Rand Corporation, indicates the measured time difference between the arrival of master and slave pulses as a number on a mechanically driven revolution counter. Accordingly, the mechanical shaft driving the revolution counter may be coupled through appropriate gearing so that a 100 microsecond change in the time difference as read on the revolution counter corresponds to one turn of shaft 85. For example, assume that the position of a vehicle to be navigated by means of the loran system is situated between two discrete adjacent lines of position, one line corresponding to a time difference of 2600 microseconds, and the other line corresponding to a time difference of 2700 microseconds. Grid lines $Y_2$ and $Y_3$ on chart 12 would correspond to the loran lines representing respectively 2600 and 2700 microseconds. Any intermediate angular position of shaft 85 corresponding to the position of the vehicle between these two loran lines produces a second direct voltage to which the direct voltage of capacitor 90 would be compared. Thus, the position of the indicator with respect to chart 12 represents the position of the vehicle with respect to the discrete loran lines of position.

*Plotting across grid lines*

For purposes of the preceding description, indicator 13 is shown in Fig. 1 to be located approximately midway between a pair of yellow grid lines $Y_2$ and $Y_3$. With the indicator remote from any grid line, the apparatus described heretofore is sufficient to enable the indicator to plot the course of a moving vehicle with respect to one grid line set. In such operation, the photoscanner interpolates between adjacent grid lines. However, as the vehicle approaches near to and crosses a discrete coordinate line, further apparatus is necessary and will now be described. When the vehicle approaches close to a discrete coordinate line, the photoscanner will begin to interpolate between adjacent points located midway between the grid lines along locus p—p'. This auxiliary method of interpolation permits the indicator to cross a grid line without a portion of the system sensing its presence. Actually, interpolation is accomplished by generating and utilizing a pair of auxiliary voltages, one representing the position of the indicator relative to a midpoint between the grid lines and the other representing the position of the vehicle relative to a midpoint between corresponding discrete coordinate lines. For purposes of the ensuing explanation, indicator 13 is shown in Fig. 1 to be close to grid line $B_3$.

*Blue channel operation*

For sake of clarity, the system will now be described by considering only its operation during the intervals when the photoscanner is responsive to the blue grid lines. During this interval photoscanner 10 is scanning the chart through slit 19 and the second three pulses of waveform A recur. Switch 31 is not actuated and the movable contacts of relay sections 77, 78, 79 register with their respective upper fixed contacts. The position of the movable contact of relay sections 62, 67, and 88 of relay 34 are determined by the setting of shaft 85. The positions of the movable contacts of relay sections 63, 68 and 101 of relay 35 are determined by the setting of shaft 102. A first rotary switch 103 comprises a movable contact 104 and a fixed arcuate contact 105. A second rotary switch 106 comprises a movable contact 107 and a fixed arcuate contact 108. Movable contact 104 is connected to shaft 85 so that the position of movable contact 104 corresponds to the position of pointer 87 and arm 84. Movable contact 107 is connected to shaft 102 so that the position of movable contact 107 corresponds to the position of pointer 111 and arm 112. Fixed contacts 105 and 108 each subtend an arc of 180° and each is connected to a voltage source. Contact is made between each of the movable contacts 104, 107 and its respective fixed contact only when the corresponding arms 84 and 112 are less than 90° from either extremity of the voltage dividers 82 and 83. When such contact is made, a voltage is delivered to the corresponding one of relay windings 114 and 115 of respective relays 34 and 35 causing the respective movable contacts of said relay windings to register with their respective upper fixed contacts. As the degree of rotation of each of shafts 85 and 102 represents the position of the vehicle with respect to an adjacent discrete line of each set of coordinate lines, relay windings 114 and 115 are energized whenever the vehicle is closer to the nearest discrete coordinate line than one-quarter of the distance between the two discrete coordinate lines adjacent to the vehicle. When the vehicle is farther from the nearest discrete coordinate line than one-quarter of said distance between adjacent lines, the respective relay windings 114 and 115 are not energized, and their corresponding movable contacts contact the opposite lower fixed contacts. Therefore, in the depicted position of the indicator, which corresponds to the position of the vehicle, yellow channel relay winding 114 is not energized and blue channel relay winding 115 is energized. The movable contacts of the blue channel relay are therefore connected to their respective upper fixed contacts. A small amount of backlash is provided between shaft 85 and contact 104 and between shaft 102 and contact 107 to prevent oscillation in the condition when the vehicle is moving parallel to the boundary line defining the points at which relay windings 114 and 115 become energized.

Photoscanner 10 scans the blue lines delivering recurrent pulses $B_2$, $B_3$, and $B_4$. During each revolution of the drum 18, as described previously, primary sawtooth generator 65 produces a sawtooth voltage of waveform C. The peak value of the primary sawtooth cycle generated in the interval between the pulses $B_2$ and $B_3$ is proportional to the distance between the grid lines $B_2$ and $B_3$, as measured along locus p—p'. A direct voltage equal to one-half this peak value is applied on lead 117 as a bias voltage to comparator circuit 69. The primary sawtooth voltage of waveform C is also applied to comparator circuit 69. When the primary sawtooth wave becomes greater than the bias direct voltage applied to the comparator (dotted line of waveform C), an output signal (waveform M) is produced by comparator 69. A pulse generator 118 is coupled to comparator 69 and responsive to the output voltage thereof producing a pulse (waveform N) at the instant the primary sawtooth wave exceeds the bias level. The pulses of waveform N simulate a series of blue grid lines along locus p—p', having the spacing of the blue grid lines, but displaced therefrom by a distance equal to one-half that between grid lines $B_2$ and $B_3$. Since line segment s—s' is parallel to the short diagonal of the parallelogram formed by grid lines $Y_2$, $Y_3$ and $B_2$, $B_3$, the distance between each of these pair of lines along locus p—p' is the same. Therefore, the pulses of waveform N also simulate a series of yellow grid lines displaced from the real yellow grid lines by a distance equal to half the aforementioned diagonal. The pulse train of waveform N is coupled to a delay pulse generator 119 to produce the slightly delayed output pulse train of waveform O, and to the upper fixed contacts of relay sections 62 and 63. An auxiliary sawtooth generator 120 coupled to delay pulse generator 119 is responsive to the pulses of waveform O, producing an auxiliary linear sawtooth voltage wave of waveform P. In the example illustrated, the auxiliary sawtooth wave lags the primary sawtooth wave by one-half the time interval between the photoscanner pulses $B_2$ and $B_3$. The auxiliary sawtooth wave of sawtooth generator 120 is coupled to the upper fixed contacts of relay sections 67 and 68.

The movable contacts of relay sections 67 and 68 select either the primary sawtooth wave at their respective lower fixed contacts or the auxiliary sawtooth wave at their respective upper fixed contacts. The movable contacts of relay sections 62 and 63 select either the photoscanner pulses of waveform A, corresponding to the grid lines being scanned, at their respective lower fixed contacts, or the pulse train of waveform N, corresponding to points located midway between the grid lines, at their respective upper fixed contacts. In the present example, relay section 68 couples the auxiliary sawtooth voltage wave to position sampling gate 71, and relay section 63 couples the auxiliary trigger pulses of waveform N to pulse selector 72 when relay winding 76 is unexcited; i.e., during the blue grid line scanning interval. Pulse selector 72 now delivers an output pulse coincident with only the first pulse of waveform N following the blue reference pulses of waveform D. These selected pulses are shown in waveform Q. Peak sampling gate 80 now receives for sampling the auxiliary sawtooth voltage wave through relay sections 68, 79 and has applied thereto the recurrent pulses of waveform Q for actuation. Because the pulses of waveform Q lag slightly those of waveform O, gate 80 charges capacitor 122 to the peak value of the auxiliary sawtooth cycle generated during a time interval equal to that between the pulses $B_2$ and $B_3$ of waveform A. As photoscanning is accomplished parallel to the short diagonal previously mentioned, the intervals between the pulses $Y_2$ and $Y_3$ and the pulses $B_2$ and $B_3$ are substantially equal. Therefore, the voltages developed across capacitors 81 and 122 are always substantially equal (i.e. waveform H), so long as the photoscanner is scanning parallel to the aforementioned diagonal, and regardless of whether either or both the blue and yellow channels are in primary or auxiliary operation.

The voltage of waveform H is applied to a voltage divider comprising the equal resistors 123, 124. Lead 117 is connected to the midpoint of this voltage divider and serves to apply to comparator circuit 69 a biasing voltage equal to one-half the peak value of the sawtooth cycle generated between the pulses $B_2$ and $B_3$. A reset circuit 125 samples the voltage at the junction of resistors 123, 124. Under certain conditions, as when the scanning signal is momentarily interrupted, the biasing level applied to comparator 69 might become so high as to exceed the maximum value of the primary sawtooth wave applied to the comparator. This would cause the auxiliary sawtooth circuit to fail to operate. Reset circuit 125 is connected to and will short to ground the auxiliary generator when the sample voltage exceeds a predetermined level, thereby preventing loss of the auxiliary sawtooth signal.

Position sampling gate 71 receives for sampling the auxiliary sawtooth wave through relay section 68, and has applied thereto the blue reference pulses of waveform D for actuation. Gate 71 charges capacitor 126 to the instantaneous value of the auxiliary sawtooth wave at the instant of occurrence of the blue reference pulses. Capacitor 126 produces a direct output voltage of waveform R having a magnitude representing the distance between the indicator and a point midway between the grid lines $B_2$ and $B_3$. The voltage of waveform R is coupled to the right fixed contact of relay 127.

A third direct voltage, shown as waveform S, is produced at an arm 129 of voltage divider 83. Arm 129 is fixed diametrically opposite arm 112 and insulated therefrom. The ratio of the voltage of arm 112 to the direct voltage H applied to divider 83 is equal to the ratio represented by the blue channel positional signal signal driving shaft 102. The blue channel input positional represents the ratio of the distance of the vehicle from an adjacent discrete coordinate line to the distance between the discrete coordinate lines adjacent the vehicle. Therefore, the ratio represented by the third direct voltage of arm 129 differs from the ratio represented by the blue channel input positional signal by the value one-half. Consequently, the third direct voltage represents the position of the vehicle with respect to points spaced substantially midway between the coordinate lines corresponding to the blue grid lines. The third direct voltage is coupled through the upper fixed contact of relay section 101 to the left fixed contact of relay 127.

An error control voltage whose magnitude varies according to the difference between the third direct voltage of waveform S and the direct voltage of waveform R is produced for controlling the position of photoscanner 10 along locus p—p'. An error voltage of waveform R is the movable contact of relay 127. This movable contact alternates between the relay fixed contacts at the frequency of an alternating switching voltage supplied to relay winding 130 and serves to compare the magnitudes of the two direct voltages applied to the fixed contacts. This error voltage is coupled to a filter and servo amplifier 132 to produce a sinusoidal error voltage similar to waveform L. The phase of this error control voltage is determined by the larger of the two direct voltages which were compared, and its amplitude is determined by the difference between the two voltages. The blue error control voltage is coupled through a lead 133 to a second stator winding of resolver 95.

Thus, by employing the auxiliary direct voltage of divider arm 129, in lieu of the direct voltage of divider arm 112, and by employing the auxiliary sawtooth voltage wave, the apparatus is able to plot the course of the vehicle as it crosses the discrete coordinate lines.

*Positioning the photoscanner*

Resolver 95 has a pair of stator windings and a pair of rotor windings, one winding of each pair being oriented 90° with respect to the other winding of the pair. The stator of resolver 95 is mounted directly on housing 14 at a position displaced from the vertical axis passing through the center of the photoscanner. The shaft of the rotor of resolver 95 extends parallel to the vertical axis and is coupled by a gear 135 to spur gear 38. As housing 14 rotates about its vertical axis, thereby orienting the direction of scan parallel to the short diagonal of the grid line parallelogram, gear 135 is driven around the periphery of spur gear 38, thereby maintaining the two rotor resolver windings oriented respectively parallel to the x and y axes. Simultaneously the stator windings remain aligned respectively at angles of 45° with respect to the direction of scan of the photoscanner. Each of the stator windings receives one of the blue and yellow error control voltages on respective leads 133 and 93. The resolver output voltages taken from the two rotor windings are applied through respective amplifiers 136 and 137 to the respective $x$ and $y$ axis servomotors 57 and 46, the servomotors acting to position the photoscanner so that indicator 13 continuously plots the course of the moving vehicle.

Scanning parallel to the short diagonal of the grid line parallelogram bounding the position of indicator 13 is described in detail in the aforementioned U.S. patent application 537,629. It may be accomplished in the instant invention by comparing the direct voltages developed across capacitors 81 and 122. Capacitor 81 is charged to the peak value of the primary sawtooth cycle generated while the scanner is scanning along line segment $s$—$s'$ between the grid lines $Y_2$ and $Y_3$. Capacitor 122 is charged to the peak value of the auxiliary sawtooth cycle that is equal to the peak value of the primary sawtooth cycle generated while the scanner is scanning between the grid lines $B_2$ and $B_3$. Whether the particular operation utilizes the primary or auxiliary sawtooth cycle, the direct voltage stored in a particular one of capacitors 81 or 122 is proportional to the spacing between the two grid line pairs comprising a parallelogram. A vibrator 138 alternately samples the values of voltage stored in capacitors 81 and 122, delivering a square wave error signal having a relative phase determined by the larger stored voltage and having a relative magnitude depending on the difference between the two stored voltages. The error signal of vibrator 138 is applied to a filter and servo amplifier 139, which delivers an amplified sine wave error control signal through lead 140 to servo motor 36. This error control signal energizes servomotor 36 causing it to turn in the proper direction to reduce the error control signal to zero, and thereby effectuates scanning along grid line parallelogram diagonal.

Although this invention has been described as employing direct voltages at controllable amplitudes to represent various ratios and linear distances, it is within the scope of this invention to employ signals of other types, such as different amplitude alternating voltages, electrical signals of different frequencies, digital code signals, mechanical signals of shaft rotation, and mechanical signals of displacement.

The invention also discloses the employment of two sets of grid coordinates of different colors to obtain two independent signals. Other corresponding means to separate the signals obtained from two intersecting grid coordinate sets may be employed; such as employing coded grid coordinates, wherein one grid coordinate set employs a single line per grid coordinate and the other set employs two lines per grid coordinate, or employing separate charts and scanners for each grid line set. As this invention measures the physical distance between the grid lines, and then interpolates therebetween, an accurate plot of the position of the vehicle will be produced regardless of the scale of the chart and regardless of any shrinkage or expansion of the chart. Furthermore, since the photoscanner is always oriented to scan along the parallelogram diagonals the orientation of the chart with respect to carriage 11 does not affect the operation of the system.

The principles of this invention are not confined to the embodiment described herein but are applicable to the more general class of coordinate transformation devices, one example of such class being the course plotter described in detail. In the course plotter first coordinate data in the form of time difference dimensions is transformed to second coordinate data representing distances on a chart, as represented by the position of the indicator or by the rotation of the $x$- and $y$-axis lead screws. The device receives a plurality of input signals representative of the dimensions in the first coordinate system, these dimensions being given by time difference values. The device stores discrete sets of transformation data for each of a finite number of subregions in the first coordinate system. The transformation data stored in the course plotter comprises the lengths of the chart parallelogram diagonals for a given difference between the time difference coordinate. Means is provided for reading out the stored transformation data corresponding to a particular subregion when the point whose coordinates are to be transformed—in this instance the vehicle—lie in the corresponding subregion. Computer means are provided to apply the transformation data to the input signals, the output of the computer means being the coordinates of the point in the second coordinate system, i.e., the position of the vehicle with respect to the chart in $x$—$y$ or other coordinates. The principles of this invention are particularly applicable to transformations wherein the second coordinate system is non-linearly related to the first coordinate system; that is, the transformation data is a function of the coordinates of the point to be transformed. The transformation of the hyperbolic lines of position of loran to a gridded chart is an example of a non-linear transformation.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. In an apparatus for plotting on a chart the position of a vehicle, said position being defined by a navigational coordinate system comprising first and second sets of intersecting coordinate lines of constant time differences, said chart having superposed thereon first and second intersecting grid line sets, the lines of said first grid line set corresponding to discrete lines of said first coordinate line set, the lines of said second grid line set corresponding to discrete lines of said second coordinate line set, wherein said grid line sets form parallelogram-like figures having opposite sides common to one grid line set, said apparatus receiving a first input signal representing the ratio of the difference between the time difference of the first set coordinate line passing through the position of the vehicle and the time difference of one of said discrete lines of the first coordinate line set adjacent said vehicle to the difference between the time differences of the two discrete lines of the first coordinate line set adjacent said vehicle, said apparatus receiving a second input signal representing the ratio of the difference between the time difference of the second set coordinate line passing through the position of the vehicle and the time difference of one of said discrete lines of the second coordinate line set adjacent said vehicle to the difference between the time differences of the two discrete lines of the second coordinate line set adjacent said vehicle, the combination comprising means for scanning said chart along a locus parallel to a diagonal of the grid line parallelogram containing the point corresponding to the position of the vehicle, first means responsive to said scanning means for generating a third signal proportional to the distance along said locus between the two lines of the first grid line set adjacent said point, second means responsive to said scanning means for generating a fourth signal proportional to the distance along said locus between the two lines of the second grid line set adjacent said point, and first and second multiplying means each adapted to receive two input signals and to deliver an output signal representing the product of the two input signals, said first multiplying means adapted to receive said first and third signals and said second multiplying means adapted to receive said second and fourth signals, whereby the output signal of the first multiplying means represents the distance along said locus between said point and one of said two lines of the first grid line set and the output signal of the second multiplying means represents the distance along said locus between said point and one of said two lines of the second grid line set.

2. In an apparatus for plotting on a chart the position of a vehicle, said position being defined by a navigational coordinate system comprising first and second sets of intersecting coordinate lines of constant time differences, said chart having superposed thereon first and second intersecting grid line sets, the lines of said first grid line set corresponding to discrete lines of said first coordinate line set, the lines of said second grid line set corresponding to discrete lines of said second coordinate line set, wherein said grid line sets form parallelogram-like figures having opposite sides common to one grid line set, said apparatus receiving a first input signal representing the ratio of the difference between the time difference of the first set coordinate line passing through the position of the vehicle and the time difference of one of said discrete lines of the first coordinate line set adjacent said vehicle to the difference between the time differences of the two discrete lines of the first coordinate line set adjacent said vehicle, said apparatus receiving a second input signal representing the ratio of the difference between the time difference of the second set coordinate line passing through the position of the vehicle and the time difference of one of said discrete lines of the second coordinate line set adjacent said vehicle to the difference between the time differences of the two discrete lines of the second coordinate line set adjacent said vehicle, the combination comprising means for scanning said chart along a locus parallel to a diagonal of the grid line parallelogram containing the point corresponding to the position of the vehicle, means responsive to said scanning means for generating a third signal proportional to the distance along said locus between the two lines of one of said grid line sets adjacent said point, and first and second multiplying means each adapted to receive two input signals and to deliver an output signal representing the product of the two input signals, said first multiplying means adapted to receive said first and third signals and said second multiplying means adapted to receive said second and third signals, whereby the output signal of the first multiplying means represents the distance along said locus between said point and one of the two lines of the first grid line set adjacent said point and the output signal of the second multiplying means represents the distance along said locus between said point and one of the two lines of the second grid line set adjacent said point.

3. In an apparatus for plotting on a chart the position of a vehicle, said position being defined by a navigational coordinate system comprising first and second sets of intersecting coordinate lines, said chart having superposed thereon first and second intersecting grid line sets, the lines of said first grid line set corresponding to discrete lines of said first coordinate line set, the lines of said second grid line set corresponding to discrete lines of said second coordinate line set, wherein said grid line sets form parallelogram-like figures having opposite sides common to one grid line set, said apparatus receiving a first input signal representing the ratio of the difference between the value of the first set coordinate line passing through the position of the vehicle and the value of one of said discrete lines of the first coordinate line set adjacent said vehicle to the difference between the values of the two discrete lines of the first coordinate line set adjacent said vehicle, said apparatus receiving a second input signal representing the ratio of the difference between the value of the second set coordinate line passing through the position of the vehicle and the value of one of said discrete lines of the second coordinate line set adjacent said vehicle to the difference between the values of the two discrete lines of the second coordinate line set adjacent said vehicle, the combination comprising means for scanning said chart along a locus parallel to a diagonal of the grid line parallelogram containing the point corresponding to the position of the vehicle, means responsive to said scanning means for generating a third signal proportional to the distance along said locus between the two lines of one of said grid line sets adjacent said point, and first and second multiplying means each adapted to receive two input signals and to deliver an output signal representing the product of the two input signals, said first multiplying means adapted to receive said first and third signals and said second multiplying means adapted to receive said second and third signals, whereby the output signal of the first multiplying means represents the distance along said locus between said point and one of the two lines of the first grid line set adjacent said point and the output signal of the second multiplying means represents the distance along said locus between said point and one of the two lines of the second grid line set adjacent said point.

4. In an apparatus for plotting on a chart the position of a first point in a coordinate system comprising first and second sets of intersecting coordinate lines, said chart having superposed thereon first and second intersecting grid line sets, the lines of said first grid line set corresponding to discrete lines of said first coordinate line set, the lines of said second grid line set corresponding to discrete lines of said second coordinate line set, said apparatus receiving a first input signal representing the ratio of the difference between the value of the first set coordinate line passing through the first point and the value of one of said discrete lines of the first coordinate line set adjacent said first point to the difference between the values of the two discrete lines of the first coordinate line set adjacent said first point, said apparatus receiving a second input signal representing the ratio of the difference between the value of the second set coordinate line passing through the first point and the value of one of said discrete lines of the second coordinate line set adjacent said first point to the difference between the values of the two discrete lines of the second coordinate line set adjacent said first point, the combination comprising means for scanning said chart along a substantially straight line locus intersecting said first and second grid line sets and containing a second point corresponding to the position of the first point, means responsive to said scanning means for generating third and fourth signals proportional to the respective distances along said locus between the two lines of said first grid line set and the two lines of said second grid line set adjacent said second point, and first and second multiplying means each adapted to receive two input signals and to deliver an output signal representing the product of the two input signals, said first multiplying means adapted to receive said first and third signals and said second multiplying means adapted to receive said second and fourth signals, whereby the output signal of the first multiplying means represents the distances along said locus between said second point and one of said two lines of the first grid line set and the output signal of the second multiplying means represents the distance along said locus between said second point and one of said two lines of the second grid line set.

5. In an apparatus for transforming the position of a first point in a first coordinate system comprising first and second sets of intersecting coordinate lines into a second coordinate system comprising third and fourth sets of intersecting coordinate lines, the lines of said third coordinate line set corresponding to discrete lines of said first coordinate line set, the lines of said fourth coordinate line set corresponding to discrete lines of said second coordinate line set, wherein said third and fourth coordinate line sets form parallelogram-like figures having opposite sides common to one coordinate line set, said apparatus receiving a first input signal representing the ratio of the difference between the value of the first set coordinate line passing through the first point and the value of one of said discrete lines of the first coordinate line set adjacent said first point to the difference between the values of the two discrete lines of the first coordinate line set adjacent said first point, said apparatus receiving a second input signal representing the ratio of the difference between the value of the second set coordinate line passing through the first point and the value of one of said discrete lines of said second coordinate line set adjacent said first point to the difference between the values of the two discrete line sets of the second coordinate line set adjacent said first point, the combination comprising means for generating a third signal proportional to the distance between the two lines of one of said third and fourth coordinate line sets adjacent a second point corresponding to the position of said first point, said distance being measured along a locus parallel to a diagonal of the second coordinate system parallelogram containing said second point, and first and second multiplying means each adapted to receive two input signals and to deliver an output signal representing the product of the two input signals, said first multiplying means adapted to receive said first and third signals and said second multiplying means adapted to receive said second and third signals, whereby the output signal of the first multiplying means represents the distance along said locus between said second point and one of the two lines of the third coordinate line set adjacent said second point, and the output signal of the second multiplying means represents the distance along said locus between said second point and one of the two lines of the fourth coordinate line set adjacent said second point.

6. In an apparatus for transforming the position of a first point in a first coordinate system comprising first and second sets of intersecting coordinate lines into a second coordinate system comprising third and fourth sets of intersecting coordinate lines, the lines of said third coordinate line set corresponding to discrete lines of said first coordinate line set, the lines of said fourth coordinate line set corresponding to discrete lines of said second coordinate line set, said apparatus receiving a first input signal representing the ratio of the difference between the value of the first set coordinate line passing through the first point and the value of one of said discrete lines of the first coordinate line set adjacent said first point to the difference between the values of the two discrete lines of the first coordinate line set adjacent said first point, said apparatus receiving a second input signal representing the ratio of the difference between the value of the second set coordinate line passing through the first point and the value of one of said discrete lines of the second coordinate line set adjacent said first point to the difference between the values of the two discrete lines of the second coordinate line set adjacent said first point, the combination comprising means for generating a third signal proportional to the distance along a substantially straight line locus between the two lines of said third coordinate line set adjacent a second point corresponding to said first point, said locus intersecting said third and fourth coordinate line sets and containing said second point, means for generating a fourth signal proportional to the distance along said locus between the two lines of said fourth coordinate line set adjacent said second point, and first and second multiplying means each adapted to receive two input signals and to deliver an output signal representing the product of the two input signals, said first multiplying means adapted to receive said first and third signals and said second multiplying means adapted to receive said second and fourth signals, whereby the output signal of the first multiplying means represents the distance along said locus between said second point and one of said two lines of the third coordinate line set and the output signal of the second multiplying means represents the distance along said locus between said second point and one of said two lines of the fourth coordinate line set.

7. In an apparatus for transforming the position of a first point in a first coordinate system comprising first and second sets of intersecting coordinate lines into a second coordinate system comprising third and fourth sets of coordinate lines, the lines of said third coordinate line set corresponding to discrete lines of said first coordinate line set, the lines of said fourth coordinate line set corresponding to discrete lines of said second coordinate line set, said apparatus receiving a first input signal representing the ratio of the difference between the value of the first set coordinate line passing through the first point and the value of one of said discrete lines of the first coordinate line set adjacent said first point to the difference between the values of the two discrete lines of the first coordinate line set adjacent said first point, said apparatus receiving a second input signal representing the ratio of the difference between the value of the second set coordinate line passing through the position of the first point and the value of one of said discrete lines of the second coordinate line set adjacent said first point to the difference between the values of the two discrete lines of the second coordinate line set adjacent said first point, the combination comprising means for generating a third signal proportional to the distance along a substantially straight line first locus between the two lines of said third coordinate line set adjacent a second point corresponding to said first point, said first locus intersecting said third coordinate line set and containing said second point, means for generating a fourth signal proportional to the distance along a substantially straight line second locus between the two lines of said fourth coordinate line set adjacent a third point corresponding to said first point, said second locus intersecting said fourth coordinate line set and containing said third point, said first and second loci being parallel, and first and second multiplying means each adapted to receive two input signals and to deliver an output signal representing the product of the two input signals, said first multiplying means adapted to receive said first and third signals and said second multiplying means adapted to receive said second and fourth signals, whereby the output signal of the first multiplying means represents the distance along said first locus between said second point and one of said two lines of the third coordinate line set and the output signal of the second multiplying means represents the distance along said second locus between said third point and one of said two lines of the fourth coordinate line set.

8. In apparatus for transforming a plurality of first type coordinates descriptive of the position of a point with respect to a region into a plurality of second type coordinates, said region being divided into subregions, said apparatus receiving input signals representing the first type coordinates of said position, means for storing a plurality of discrete sets of transformation data, each set relating the second type coordinates to the first type coordinates at a point in one of said subregions, one of said sets being assigned to each subregion, means responsive to said input signals for reading one of said sets of stored transformation data and for delivering output signals representative thereof when said point is in the corresponding subregion, and means for receiving said input signals and said output signals and responsive thereto for delivering further output signals representing the second type coordinates of said position.

9. Apparatus for effecting the transformation of a plurality of first type coordinates descriptive of the position of a point with respect to a region into a plurality of second type coordinates, said second type coordinates being non-linearly related to said first type coordinates, said region being divided into subregions, comprising means for receiving input signals representing the first type coordinates of said position, means for storing a plurality of discrete sets of transformation data, each set relating the second type coordinates to the first type coordinates at a point in one of said subregions, one of said sets being assigned to each subregion, means responsive to said input signals for reading one of said sets of stored transformation data and for delivering output signals representative thereof when said point is in the corresponding subregion, and means for receiving said input signals and said output signals and responsive thereto for delivering further output signals representing the second type coordinates of said position.

10. Apparatus as in claim 9, wherein said subregions are bounded by first type coordinate lines.

11. Apparatus as in claim 10, wherein said first type coordinates are hyperbolic and said second type coordinates are rectangular.

12. Apparatus for transforming a plurality of first type components of information into a plurality of second type components of information, the relationship between said second and first type components being dependent on the collective values of said first type components, the collective values of said first type components being divided into groups, comprising means for receiving input signals representing said first type components, means for storing a plurality of discrete sets of transformation data, each set relating the second type components to the first type components for a particular collective value of said first type components in one of said groups, means responsive to said input signals for reading one of said sets of stored transformation data and for delivering output signals representative thereof when said input signals represent first type components of collective values lying in the corresponding group, and means for receiving said input signals and said output signals and responsive thereto for delivering further output signals representing said second type components of information.

13. In an apparatus for plotting on a chart the position of a vehicle, said position being defined by a navigational coordinate system comprising first and second sets of intersecting coordinate lines of constant time differences, said chart having superposed thereon first and second intersecting grid line sets, the lines of said first grid line set corresponding to discrete lines of said first coordinate line set, the lines of said second grid line set corresponding to discrete lines of said second coordinate line set, wherein said grid line sets form parallelogram-like figures having opposite sides common to one grid line set, said apparatus receiving a first input signal representing the ratio of the difference between the time difference of the first set coordinate line passing through the position of the vehicle and the time difference of one of said discrete lines of the first coordinate line set adjacent said vehicle to the difference between the time differences of the two discrete lines of the first coordinate line set adjacent said vehicle, said apparatus receiving a second input signal representing the ratio of the difference between the time difference of the second set coordinate line passing through the position of the vehicle and the time difference of one of said discrete lines of the second coordinate line set adjacent said vehicle to the difference between the time differences of the two discrete lines of the second coordinate line set adjacent said vehicle, the combination comprising means for scanning said chart along a locus parallel to a diagonal of the grid line parallelogram containing the point corresponding to the position of the vehicle, means responsive to said scanning means for generating a third signal proportional to the distance along said locus between the two lines of one of said grid line sets adjacent said point, first and second multiplying means each adapted to receive two input signals and to deliver an output signal representing the product of the two input signals, said first multiplying means adapted to receive said first and third signals and said second multiplying means adapted to receive said second and third signals, whereby the output signal of the first multiplying means represents the distance along said locus between said point and one of said two lines of the first grid line set and the output signal of the second multiplying means represents the distance along said locus between said point and one of said two lines of the second grid line set, indicator means for representing the position of said vehicle on said chart, means for generating a fourth signal proportional to the distance along said locus between said indicator means and the grid line corresponding to said one discrete line of said first coordinate line set, means for generating a fifth signal proportional to the distance along said locus between said indicator means and the grid line corresponding to said one discrete line of said second coordinate line set, and first and second comparator means, each adapted to receive a pair of input signals and to deliver an output signal representing the difference between the received signals, said first comparator means being connected to receive the output signal of said first multiplying means and said fourth signal, and said second comparator means being connected to receive the output signal of said second multiplying means and said fifth signal.

14. Apparatus as in claim 13 further including means connected to said first and second comparator means and responsive to the output signals thereof for movingn said scanning means to reduce the output signals of said first and second comparator means to zero.

15. Apparatus for automatically moving the position of a scanner with respect to a predetermined position located between a first and a second pair of lines on a chart, said first line pair intersecting said second line pair, said scanner recurrently scanning said chart along a straight line crossing both lines of both pairs of lines and producing recurring and alternate first and second pairs of output pulses corresponding respectively to the first line pair and the second line pair being scanned, said scanner further producing recurrent reference output pulses whose temporal position occurs at the center of each scanning cycle, comprising in combination, sawtooth generating means coupled to said scanner and alternately responsive to said first and second pulse pairs for producing respective alternate linear sawtooth output voltages, first and second peak sampling means coupled to said sawtooth generating means and respectively responsive to the alternate peak sawtooth output voltages thereof for producing respective first and second direct output voltages whose magnitudes are respectively proportional to the distances along the line of scan between the lines of said first and second line pairs, first and second adjustable voltage dividing means respectively coupled to said first and second peak sampling means and responsive to the respective output voltages thereof, first and second adjusting means coupled respectively to said first and second voltage dividing means for setting the respective amount of voltage division produced therein, said voltage dividing means producing respective third and fourth direct output voltages whose respective magnitudes represent the distance along the line of scan between one line of said first pair and one line of said second line pair and said predetermined position, said predetermined position being determined by the setting of said voltage dividing means, first and second comparing means coupled respectively to receive said third and fourth direct voltages, said first and second comparing means being further connected to receive said sawtooth generator output and to receive the reference output pulses of said scanner, said first comparing means being responsive to the difference between the magnitude of said third direct output voltage and the magnitude of one set of alternate sawtooth voltage cycles of said sawtooth generating means at the instant of occurrence of said reference pulses for producing a first error control voltage, said second comparing means being responsive to the difference between the magnitude of said fourth direct output voltage and the magnitude of the other set of alternate sawtooth voltage cycles of said sawtooth generating means at the instant of occurrence of said reference pulses for producing a second error control voltage, said error control voltages having magnitudes dependent on the distances between said predetermined position and the center of scan position of said scanner.

16. Apparatus as in claim 15, further including means coupled to said first and second comparing means and responsive to the error control voltages thereof for controlling the position of said scanner relative to said predetermined position.

17. Apparatus as in claim 15, further including rotating means for turning said scanner about an axis perpendicular to its line of scan for varying the direction of scan, third comparing means coupled to said first and second peak sampling means and responsive to the difference between the respective output voltages thereof for producing a corresponding third error control voltage, and means for coupling said rotating means to receive the third error control voltage, whereby said rotating means turns said scanner to reduce said third error control voltage to zero.

18. Apparatus for comparing the location of a photoscanner with respect to a chart representing an area to the position of a point with respect to said area, the position of said point with respect to said area being determined by its location relative to a coordinate system comprising first and second sets of lines, said first line set intersecting said second line set, said chart being illuminated and having superposed thereon first and second line sets corresponding respectively to said first and second coordinate line sets, said apparatus receiving first input signals representing a first ratio equal to the distance of said point from one adjacent line of the first coordinate line set divided by the distance between the two lines of said first coordinate line set adjacent said point, said apparatus receiving a second input signal representing a second ratio equal to the distance of said point from one adjacent line of the second coordinate line set divided by the distance between the two lines of said second coordinate line set adjacent said point, said photoscanner having photosensitive means for producing an output electrical signal in accordance with the amount of light received and a directive means for directing light received from an elemental area of the chart upon said photosensitive means, the orientation of the directive means being recurrently varied whereby said photosensitive means receives light recurrently and successively from a series of contiguous elemental areas defining a straight line locus crossing at least a pair of lines of each chart line set, and whereby the output signal of the photosensitive means consists of recurrent and alternate first and second groups of pulses corresponding respectively to the lines of said first and second chart line sets, each of said pulse groups being recurrent at one-half the frequency of variation of the directive means and the time between pulses of a group corresponding to the spacing of the respective chart lines along said locus, comprising in combination a reference pulse generator for producing reference pulses recurrent at the frequency of variation of the orientation of the directive means, said reference pulses having a temporal relationship to the pulses of each pulse group corresponding to the location of the photoscanner with respect to the chart lines, means coupled to said photoscanner and responsive to said first pulse group and to said reference pulses for producing a first direct voltage proportional to the distance along said locus between the pair of lines corresponding to the pair of pulses of said first group occurring immediately before and immediately after a reference pulse, means coupled to said photoscanner and responsive to said second pulse group and to said reference pulses for producing a second direct voltage proportional to the distance along said locus between the pair of lines corresponding to the pulses of said second group occurring immediately before and immediately after a reference pulse, first proportioning means coupled to receive said first direct voltage and responsive to said first input signal for producing a third direct voltage bearing a ratio to said first direct voltage equal to said first ratio, second proportioning means coupled to receive said second direct voltage and responsive to said second input signal for producing a fourth direct voltage bearing a ratio to said second direct voltage equal to said second ratio, means for producing a fifth direct voltage proportional to the distance along said locus of the position of said photoscanner from the chart line corresponding to said one adjacent line of the first coordinate line set, means for producing a sixth direct voltage proportional to the distance along said locus of the position of said photoscanner from the chart line corresponding to said one adjacent line of the first coordinate line set, means for producing a sixth direct voltage proportional to the distance along said locus of the position of said photoscanner from the chart line corresponding to said one adjacent line of the second coordinate line set, and first and second comparator means each adapted to produce an error voltage corresponding to the difference between a pair of received direct voltages, said first comparator means being adapted to receive said third and fifth direct voltages, said second comparator means being adapted to receive said fourth and sixth direct voltages.

19. Apparatus as in claim 18, further including third comparator means for producing an error voltage corresponding to the difference between a pair of received direct voltages, said third comparator means being adapted to receive said first and second direct voltages.

20. Apparatus as in claim 19, further including rotating means for rotating said photoscanner about an axis perpendicular to said straight line locus, and means for coupling said rotating means to said third comparator means whereby said rotating means turns said photoscanner to reduce said third comparator means error voltage to zero.

21. Apparatus as in claim 20, further including means coupled to said first and second comparator means and responsive to the error voltages thereof for controlling the location of said photoscanner by reducing the error voltages of said first and second comparator means to zero.

No references cited.

UNITED STATES PATENT OFFICE
CERTIFICATE OF CORRECTION

Patent No. 2,922,159                          January 19, 1960

Robert L. Frank

It is hereby certified that error appears in the printed specification of the above numbered patent requiring correction and that the said Letters Patent should read as corrected below.

Column 5, line 1, for "Y4" read -- Y2 --; column 10, line 57, for "of woveform R is "read -- is obtained from --; column 12, line 32, for "secnod" read -- second --; column 18, line 56, after "first" insert -- line --; column 20, lines 27 to 31, strike out "means for producing a sixth direct voltage proportional to the distance along said locus of the position of said photoscanner from the chart line corresponding to said one adjacent line of the first coordinate line set,".

Signed and sealed this 11th day of April 1961.

(SEAL)
Attest:

ERNEST W. SWIDER                                ARTHUR W. CROCKER
Attesting Officer                                      Acting Commissioner of Patents